US007476346B2

(12) United States Patent
Hagquist et al.

(10) Patent No.: US 7,476,346 B2
(45) Date of Patent: Jan. 13, 2009

(54) COMPOSITION INHIBITING THE EXPANSION OF FIRE, SUPPRESSING EXISTING FIRE, AND METHODS OF MANUFACTURE AND USE THEREOF

(75) Inventors: James Alroy E. Hagquist, St. Paul, MN (US); Robert M. Hume, III, Woodbury, MN (US); Terrance L. Lund, Woodbury, MN (US); Roderick I. Lund, Woodbury, MN (US)

(73) Assignee: Fire Jell, Inc., Woodbury, MN (US)

( * ) Notice: Subject to any disclaimer, the term of this patent is extended or adjusted under 35 U.S.C. 154(b) by 0 days.

(21) Appl. No.: 11/584,706

(22) Filed: Oct. 23, 2006

(65) Prior Publication Data

US 2007/0034823 A1 Feb. 15, 2007

Related U.S. Application Data

(62) Division of application No. 11/246,992, filed on Oct. 7, 2005, now Pat. No. 7,163,642.

(60) Provisional application No. 60/617,616, filed on Oct. 11, 2004.

(51) Int. Cl.

| | |
|---|---|
| ***A62D 1/00*** | (2006.01) |
| ***A62C 2/00*** | (2006.01) |
| ***A62C 2/06*** | (2006.01) |
| ***A63C 3/00*** | (2006.01) |
| ***C09K 21/14*** | (2006.01) |

(52) U.S. Cl. ............................... 252/606; 252/2; 252/3; 252/8.08; 252/602; 252/603; 252/607; 252/610; 169/44; 169/45; 169/46

(58) Field of Classification Search .................. 252/606
See application file for complete search history.

(56) References Cited

U.S. PATENT DOCUMENTS

| | | | | |
|---|---|---|---|---|
| 1,030,909 A | | 7/1912 | Mesturino | |
| 1,339,488 A | | 5/1920 | Weiss | |
| 1,813,367 A | | 7/1931 | Thompson | |
| 2,875,044 A | | 2/1959 | Dunn et al. | |
| 3,196,108 A | | 7/1965 | Nelson | |
| 3,284,216 A | * | 11/1966 | Kaplan | 106/16 |
| 3,464,921 A | | 9/1969 | Erler et al. | |
| 3,537,873 A | | 11/1970 | Degginger | |
| 3,719,515 A | | 3/1973 | Degginger | |

(Continued)

*Primary Examiner*—Joseph D Anthony
(74) *Attorney, Agent, or Firm*—Tipton L. Randall

(57) ABSTRACT

The invention relates to compositions that prevent expansion of a fire, suppress existing fire, as well as methods of preparing and using such compositions. The composition is comprised of water, pseudo-plastic high yield suspending agent and starch. Compositions may contain additional functional agents, such as rheological, wetting, foaming, coloring, chelating, antimicrobial and stabilizing agents. In the description of the present invention, all composition modifications are referred to as compositions. The composition, an augmentation of water, exhibits the characteristics of a sag resistant aqueous gel in the tank, but has shear thinning capacity, allowing the composition to be pumped or sprayed as easily as water. At the point of impact, when the sprayed composition is again at rest, it instantly reverts to a sag resistant aqueous gel. The composition also forms an intumescent, surface char layer upon contacting a fire. Foaming of the augmented composition on impact can be incorporated, which is advantageous for fighting petroleum fires.

4 Claims, 2 Drawing Sheets

U.S. PATENT DOCUMENTS

| | | | | |
|---|---|---|---|---|
| 3,862,854 | A | 1/1975 | Zeigerson et al. | |
| 3,902,559 | A * | 9/1975 | Everingham et al. | 169/50 |
| 3,915,911 | A | 10/1975 | Horiguchi | |
| 3,936,414 | A | 2/1976 | Wright et al. | |
| 3,962,208 | A | 6/1976 | Zeigerson et al. | |
| 4,021,464 | A | 5/1977 | Mayerhoefer et al. | |
| 4,076,580 | A | 2/1978 | Panusch et al. | |
| 4,095,985 | A | 6/1978 | Brown | |
| 4,444,914 | A | 4/1984 | Smith et al. | |
| 4,464,410 | A * | 8/1984 | Cox et al. | 426/573 |
| 4,526,234 | A | 7/1985 | Little | |
| 4,770,794 | A | 9/1988 | Cundasawmy et al. | |
| 4,820,345 | A | 4/1989 | Berg et al. | |
| 4,844,960 | A | 7/1989 | Spriggs et al. | |
| 4,849,117 | A | 7/1989 | Bronner et al. | |
| 4,859,349 | A | 8/1989 | Clark et al. | |
| 4,999,119 | A | 3/1991 | Norman et al. | |
| 5,112,533 | A | 5/1992 | Pope et al. | |
| 5,124,363 | A | 6/1992 | Stern | |
| 5,167,876 | A | 12/1992 | Lem et al. | |
| 5,218,021 | A | 6/1993 | Clark et al. | |
| 5,230,959 | A | 7/1993 | Young, Sr. et al. | |
| 5,275,875 | A | 1/1994 | Suh et al. | |
| 5,374,687 | A | 12/1994 | Cooperman et al. | |
| 5,556,578 | A | 9/1996 | Berneburg et al. | |
| 5,645,926 | A | 7/1997 | Horrocks et al. | |
| 5,663,122 | A * | 9/1997 | Mueller et al. | 507/110 |
| 5,925,457 | A | 7/1999 | McGinniss et al. | |
| 6,019,176 | A | 2/2000 | Crouch | |
| 6,036,765 | A | 3/2000 | Farrow et al. | |
| 6,045,726 | A | 4/2000 | Williams et al. | |
| 6,084,008 | A | 7/2000 | Liu | |
| 6,156,222 | A | 12/2000 | Jennings et al. | |
| 6,172,121 | B1 | 1/2001 | Chaiko | |
| 6,270,915 | B1 | 8/2001 | Turpin et al. | |
| 6,277,296 | B1 | 8/2001 | Scheffee et al. | |
| 6,279,655 | B1 | 8/2001 | Pafitis et al. | |
| 6,433,061 | B1 | 8/2002 | Marchant et al. | |
| 6,436,306 | B1 | 8/2002 | Jennings | |
| 6,458,888 | B1 | 10/2002 | Hood et al. | |
| 6,482,946 | B1 | 11/2002 | Dettloff et al. | |
| 6,492,453 | B1 | 12/2002 | Ebrahimian et al. | |
| 6,506,842 | B1 | 1/2003 | Heck et al. | |
| 6,660,190 | B2 | 12/2003 | Huhn | |
| 6,696,030 | B1 | 2/2004 | Hayden | |
| 6,716,485 | B2 | 4/2004 | Wong et al. | |
| 6,755,995 | B1 | 6/2004 | Hasegawa et al. | |
| 7,163,642 | B2 * | 1/2007 | Hagquist et al. | 252/3 |
| 2002/0121114 | A1 * | 9/2002 | Mannemann et al. | 65/135.3 |
| 2003/0141081 | A1 | 7/2003 | Clark | |
| 2004/0108615 | A1 | 6/2004 | Foley | |
| 2005/0001197 | A1 | 1/2005 | Clark | |
| 2005/0118106 | A1 * | 6/2005 | Schaefer | 424/45 |
| 2007/0034823 | A1 * | 2/2007 | Hagquist et al. | 252/2 |

* cited by examiner

COMPOSITION INHIBITING THE EXPANSION OF FIRE, SUPPRESSING EXISTING FIRE, AND METHODS OF MANUFACTURE AND USE THEREOF

CROSS-REFERENCE TO RELATED APPLICATIONS, IF ANY

This application is a divisional application of Ser. No. 11/246,992 filed Oct. 07, 2005 now U.S. Pat. No. 7,163,642.

This application claims the benefit under 35 U.S.C. §119 (e) of co-pending provisional application Ser. No. 60/617,616, filed 11 Oct. 2004. Application Ser. No. 60/617,616 is hereby incorporated by reference.

STATEMENT REGARDING FEDERALLY SPONSORED RESEARCH OR DEVELOPMENT

Not applicable.

REFERENCE TO A MICROFICHE APPENDIX, IF ANY

Not applicable.

BACKGROUND OF THE INVENTION

1. Field of the Invention

The present invention relates generally to the technical field of fire suppressant and fire preventive compositions. More particularly, the present invention relates to an inventive aqueous composition having unique properties and, most particularly, to an inventive aqueous composition more effective than water alone for fighting fires.

2. Background Information

Fire is a continuing danger to life and property worldwide. In rural areas forest, brush, and grassland fires cause immense damage each year. This destruction is not only in terms of the dollar value of timber, wildlife and livestock, but the catastrophic effects on erosion, watershed equilibrium and related problems to the natural environment. In urban areas, fire and the damage from large quantities of water used to extinguish a fire is responsible for the destruction of buildings with the loss of billions of dollars annually. Use of the composition of the present invention to replace the water used to fight fires can reduce the total water consumption by up to an order of magnitude. This reduction limits the damage caused by water in urban manufacturing facilities, and other man-made structures. Most importantly, fire is a major danger to human life. More quickly extinguishing a fire with the composition of the present invention helps reduce the loss of life to fire.

Over the years man has found numerous methods for combating fires. The use of water, foams, chemicals and other extinguishing materials are well documented. Water treated with a wetting agent has been proven to be more effective on a Class A fire where good water penetration is needed to reach and extinguish the seat of the fire. This concept is taught in U.S. Pat. No. 4,526,234 to Little. Antisettling or suspending agents are useful materials in controlling powdered flame-retardants from settling or floating. This concept is taught in U.S. Pat. No. 5,374,687 to Cooperman et al. Efforts have concentrated not only on formulations and methods for extinguishing a fire that is already in progress, but also for the prevention of fires by pretreatment of combustible surfaces. This pretreatment coating can involve man-made structures, such as buildings or storage tanks, or vegetation, such as fighting wild fires and making fire lines or fire breaks.

Currently, there have been very substantial efforts in the area of pretreatment with chemical retardants or suppressants. A number of these pretreatments have been developed and used for fighting rural forest fires. For example, antimony oxide and its complexes, borates, carbonates, bicarbonates, ammonium phosphate, ammonium sulfates, and other salts capable of being hydrated, have been demonstrated to have useful properties as firefighting chemicals. Representative prior art patents teaching the use of chemical retardants were granted in the early 1900's and continuing until more recent times. Such patents include; U.S. Pat. No. 1,030,909 to Mesturino; U.S. Pat. No. 1,339,488 to Weiss; U.S. Pat. No. 1,813,367 to Thompson; U.S. Pat. No. 2,875,044 to Dunn; U.S. Pat. Nos. 3,537,873 and 3,719,515 to Degginger; U.S. Pat. No. 4,021,464 to Mayerhoefer et al; U.S. Pat. No. 4,076,580 to Panusch et al; and U.S. Pat. No. 4,095,985 to Brown. However, although the fire inhibiting properties of the borates, carbonates and bicarbonates have been established, the use of these materials for vegetation fires has been limited because of their tendency to inhibit plant growth when used in large quantities.

Recently, attention has turned to other chemical agents, such as the synergist combination of antimony oxide and a halogen (fluorine, chlorine, bromine and iodine) or halogenated compounds. Fire retardant formulations making use of these agents are taught in U.S. Pat. No. 3,196,108 to Nelson and U.S. Pat. No. 3,936,414 to Wright et al. See also Lyons, *The Chemistry and Uses of Fire Retardants*, John Wiley & Sons, 1970 pages 147 and 411. Although extremely effective in this usage, the usefulness of the antimony/halogen combination is partially limited by the side reactions that may occur in a fire. Production of phosgene, diphosgene or chlorine gas (WW I chemical war gases) and the generation of corrosive agents, such as inorganic acids from ammonium phosphate and ammonium sulfate, requires the use of corrosion inhibitors to protect the firefighting pumping equipment and the aluminum of an aircraft. These corrosion inhibitors are expensive, sometimes toxic and increase the chance of environmental damage.

Another method of fighting fires is the pretreatment of flame-retardant materials on combustible surfaces that lead to the creation of intumescent coating materials. Intumescent materials expand with heat, similar to a vermiculite which expands when exposed to steam. The expanded layer then protects the original surface from heat and flame. The problem is that an expanded intumescent is also very fragile. This problem was soon realized, and the intumescent needed a protective hard outer coating. An intumescent ablative formulation answered this challenge and is taught by U.S. Pat. No. 6,716,485 B2 to Wong, et al. This lead to methods using carbonaceous materials to form a char instead of the materials being consumed by the fire. The making of carbonaceous chars is taught in many patents, including U.S. Pat. No. 6,696,030 B1 to Hayden.

In addition to all these problems, the most difficult problem to overcome for chemical retardant formulations is that they are relatively expensive, compared to water. Also of concern is the environmental impact of absorbent particles presently used in various gel formulations. The absorbent particles pose an environmental risk once used to fight a fire, particularly when used on a large scale, such as a forest fire. The cost factor also comes into conflict with applying them in large quantities, as is often required. In combating or preventing forest, brush and grass range fires, a considerable amount of effort has been spent in the search for low cost or waste materials that are both available in quantity and inexpensive. One such low cost waste material from the forest industry is lignosulfonates. Lignosulfonates are the sticking agent component in many fire retardant formulations. Teaching the use of lignosulfonates as components in fire retardant formulations include; U.S. Pat. No. 3,464,921 to Erler et al; U.S. Pat. Nos. 3,862,854 and 3,962,208 to Zeigerson et al; U.S. Pat. No. 3,915,911 to Horiguchi; U.S. Pat. No. 4,820,345 to Berg; U.S. Pat. No. 5,112,533 to Pope et al; U.S. Pat. No. 6,019,176 to Crouch and U.S. Pat. No. 6;277,296B1 to Scheffee et al.

Applicants have devised a unique composition for fighting fires. In a preferred embodiment, the composition consists of pseudo-plastic, high yield, suspending agent, plus starch, both swelled and suspended, in water. The effectiveness of the inventive composition is increased versus water alone. The composition forms a crust after making contact with a heat source. After crusting over occurs, continued heating or burning near the compositions causes the crust to turn to a carbonized char. At this point, the composition consists of an outer coat of char, which forms a hard, intumescent coating, and a soft interior of a gelled aqueous composition. This synergist combination of hard shell protecting a soft interior gel, remains in place until all the composition's water has been evaporated. The composition functions as a heat sink, maintaining a substrate temperature below 100° C.

SUMMARY OF THE INVENTION

The invention is directed to compositions that are easily pumped or sprayed by high pressure pumping equipment and/or that can be applied by small, low pressure, individual back tanks that firstly, prevents the expansion of fire, secondly, suppresses existing fire and thirdly, the present invention includes the methods of preparing and using such compositions.

The inventive compositions are used as an augmentation for water, and are environmentally inert. The compositions have pseudo-plastic, high yield hydraulic properties with a specific gravity very similar to water. The inventive compositions use pseudo-plastic high yield suspending agents, starch, both swelled and/or suspended, rheology modifiers, wetting agents, foaming or defoaming agents, coloring agents, antimcrobials and stabilizers added to water to produce a stable, nonsettling composition that is easily pumped or sprayed and gives sag resistance when applied on vertical or overhead surfaces. The inventive composition starves a fire of its supply of fuel and cools the substrate surface. Wetting agents help the composition penetrate into porous combustible surfaces and, with a unique combination of suspending agent and starch, resist the exiting of water via means of tack and rheology. The unique composition containing pseudo-plastic high yield suspending agent and suspended starch results in a composition that is shear thinning and, therefore, can be sprayed into a fire, with the composition holding instantly on vertical or overhead surfaces. Then, as heat from the fire raises the temperature of the composition driving off more water, the composition swells and associates more starch, raising the viscosity and making the composition even more resistant to flow.

Commonly, water is used to reduce heat and suffocate a fire, but this only occurs while the water coats the combustible surface. Typically, more than 95% of the water is lost immediately from vertical or overhead surfaces due to gravity, as depicted in FIG. 1. At this point, water loses its ability to fight the fire as it runs down the wall of a building or off the vegetation of a field or forest and into the soil. The inventive composition, with its unique combination of starch and high yield suspending agent, when exposed to the heat of a fire, does not lower in viscosity and run off, but actually increases in viscosity and becomes more tacky. Therefore, much less of the inventive composition is needed to fight the fire. Firefighting personnel now have the ability to coat a surface with a layer of augmented water, an aqueous gel of the inventive composition, which becomes stickier and more thixotropic the instant it is exposed to heat. The inventive composition eventually forms a crust as the surface dries, which is, in turn, carbonized to a char forming, intumescent coating, remaining in place regardless of the orientation of the substrate, as depicted in FIG. 2. The inventive composition uses less water to control or extinguish a fire, thereby reducing the damage caused by the run off of water after the fire is extinguished.

When applied to a fire, the inventive composition takes two forms. On the surface is the thin hard carbonized char, forming the intumescent layer and below is a sticky, thick, aqueous gel which makes up the majority of the composition. The char helps reduce the moisture loss from the aqueous gel of the composition and prevents the fire from reaching additional combustible substrates. The coated combustible substrate temperature now cannot exceed the boiling point of water (100° C.), until the aqueous gel of the composition is fully dried.

A liquid concentrate of the inventive composition is made with a simple mixer. In the mixer combine water, wetting agent, pseudo-plastic suspending agent and any known starch (amylose and amylopectin) from corn, wheat, potato, tapioca, barley, arrowroot, or rice and/or any combination of starches blended together. A dry powder blend can also be made starting with a powdered wetting agent, then adding a dry pseudo-plastic suspending agent and then adding dry powdered starch. The use of suspending agents or antisettling agents helps maintain a stable liquid mixture. The pH of the inventive composition is preferably adjusted to the range of about 5.0-8.0. A buffering agent, such as Advantex, available from Arkema Corp., composed of liquid amino alcohol, can be used to effect pH adjustment. Alternatively, simple caustic (NaOH) is used for pH adjustment. Addition of some wetting agent speeds up the mixing process and also allow the composition to better wet out combustible substrates during its use to fight fires. Examples of wetting agents include the biodegradable Triton X-100 (octylphenol ethoxylate), available from Dow Chemical Surfactants. Other elective components can be added to the inventive composition to achieve unique desired characteristics. For example, foaming agents are added to compositions for the fighting of petroleum fires, coloring agents are added to compositions to help distinguish between various composition formulations. For example, one color composition is formulated for fighting brush fires and another color composition is specifically for fighting urban building structures. Examples of foaming agents include liquid detergent, liquid soap, and AFFF (aqueous film forming foam) composed of diethylene glycol monobutyl ether, hydrocarbon surfactant, fluorocarbon surfactant, polysaccharide gum and magnesium sulfate. Coloring agent examples include water soluble food grade dyes, such as Red #40, Allura Red AC, an Orange/Red dye, Blue #2 Indigotine, Royal Blue Dye, Green #3, Fast Green FCF, a Sea Green dye.

In some instances, a defoaming agent is required for the inventive composition. Examples of defoaming agents include the silicone formulations DC-1520, FG-10 and FC-4330, available from Dow Corning. A nonionic defoaming agent suitable for preventing environmental degradation is Foamaster A-7.

Antimicrobials and stabilizers are added to the inventive composition to protect surrounding buildings from mold and extend the shelf life of the inventive composition, as well as protecting soils from the catastrophic effects of erosion and watershed equilibrium. Examples of antimicrobial agents include blends of methyl paraben and propyl paraben, and Vancide # 51, a blend of sodium dimethyldithiocarbamate and sodium 2(3H)-benzothiazolethione. Stabilizer examples include a fumed silica, such as Carb-O-Sil, or a borate. To fight fires where an extreme need to extinguish the fire in seconds is more important then toxicity concerns, conventional fire retardants such as halogens, antimony oxide and salts, such as ammonium phosphate, ammonium sulfate or other similar chemical retardants, can be used as modifiers that are easily added and then utilized with such special compositions.

DESCRIPTION OF THE EMBODIMENTS

Figure 1:
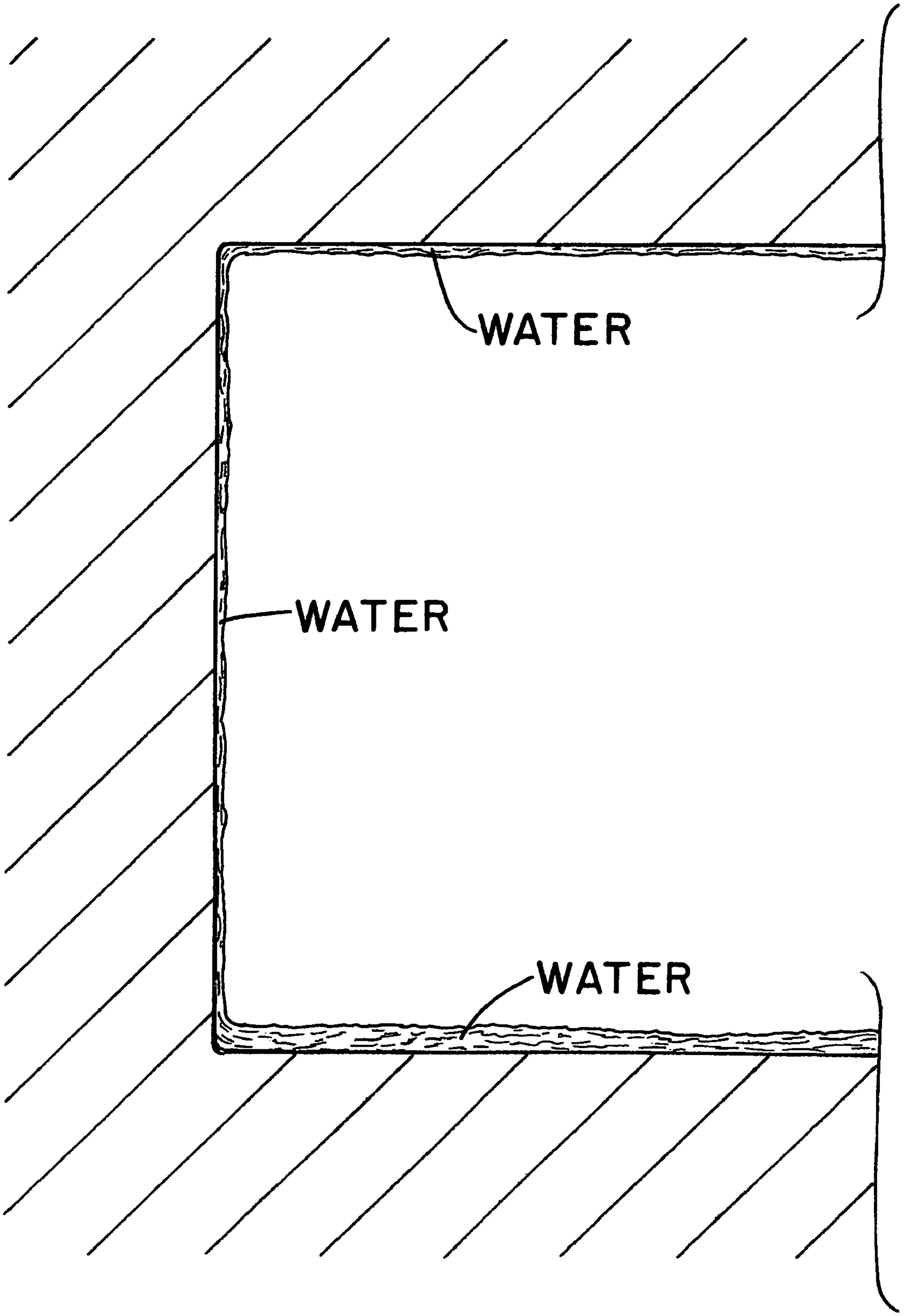
FIG. 1 is a cross sectional view of vertical and horizontal substrates within a fire following application of water alone.

The invention relates to compositions that are augmentations to water, either from concentrate or dry blends, used to extinguish fires. The concentrate or dry blend is added to a fire fighter's water reservoir and simply stirred in or allowed to recirculate. These compositions use pseudo-plastic high yield suspending agents, plus starch, both swelled and suspended, rheology modifiers, wetting agents, foaming agents, coloring agents, antimicrobials and stabilizers, added to water to produce a stable, nonsettling augmentation to water. The water augmentation, an aqueous gel of the inventive composition, is easily pumped or sprayed by typical high pressure pumping equipment or by low-pressure individual back tanks. The composition has a "high yield value," meaning it has an initial resistance to flow under stress but then is shear thinning, and when used, exhibits "vertical cling," meaning it has the ability at rest, to immediately return to a thixotropic gel. A firefighter now has a material that does not separate or settle, can be easily sprayed and immediately thickens when it contacts a wall or ceiling surface. This gives the firefighter the ability, unlike water alone, to build thickness and hold the aqueous gel of the inventive composition on vertical or overhead surfaces. The aqueous gel of the composition's mass and the vertical cling both acts as a heat sink capable of clinging to vertical and overhead surfaces. This clinging to the surfaces causes the overall temperature of the surfaces to remain below the boiling point of water. The heat sink effect does not allow the temperature of the surface coated with the aqueous gel of the composition to exceed 100° C. until all the water in the composition has been evaporated. To produce this shear thinning effect and then cling, the composition uses a pseudo-plastic high yield-suspending agent.

There are many types of pseudo-plastic high yield suspending agents or rheology modifiers that can be used successfully in the inventive composition. Two of the major groups of such suspending agents are laponites, a synthetic smectite clay, and Carbopols®, generally high molecular weigh homo- and copolymers of acrylic acid cross linked with a polyalkenyl polyether. Other polymers and synthetic clays are suitable and may be used in combination to develop special pseudo-plastic high yield suspending agent characteristics. In using a combination of these suspending agents, synergism is found, for example, between laponites and Carbopols®, where a blend offers improved characteristics for the composition. Of the group of laponites, which are synthetic smectite clays closely resembling the natural clay mineral hectoritic, it was found that Laponites RD and RDS provide the best performance. Laponites RD and RDS are layered hydrous magnesium silicates that disperse rapidly in water without the need for high shear. Laponites RD and RDS are manufactured by Southern Clay Products, Inc., Gonzales, Tex. 78629, and are commercially available from Fitz Chemical Corporation, Itasca, Ill. 60143. Laponite RDS at a concentration of about 0.001-2.0% is a highly effective rheology modifier. Laponite RDS at a concentration of about 0.1-0.5% is a preferred rheology modifier. In another major group of suspending agents, the Carbopols®, one particularly effective material is Carbopol® EZ-3, a hydrophobically modified cross-linked polyacrylate powder. The polymer is self-wetting and requires low agitation for dispersion. The convenience of low agitation is very evident in the very short wetting out time needed, when making a concentrate. Carbopol(® EZ-3 is commercially available from Noveon, Inc., Cleveland, Ohio 44141. Carbopol® EZ-3 at a concentration of about 0.001-2.0% provides acceptable performance. Carbopol® EZ-3 at a concentration of about 0.01-1.0% is a preferred rheology modifier. A blend of Carbopol® EZ-3 and Laponite RDS in the range of about 0.002-4.0% each is the most preferred rheology modifier combination. Preferably, the Carbopol® EZ-3 and Laponite RDS are present in approximately equal amounts, by weight, in the inventive composition. Both of these materials hold solid particles in suspension without allowing the solids to settle. Both of these materials have a shear thinning rheology so they can be pumped or sprayed onto a surface without the loss of cling. The Carbopol® EZ-3 is the more efficient of pseudo-plastic high yield suspending agents tested and the Laponite RDS one of the fastest to build in viscosity, as tested after shear thinning. The laponites are especially sensitive to electrolytes or the typical salts in water. Many pseudo-plastic high yield suspending agents need to be fully dispersed and hydrated in water to achieve the best performance characteristics. The inventive composition improves the overall efficiency of putting fire out with water. Other suitable pseudo-plastic, high yield, suspending agents include casein, alginates, modified cellulose, including methyl cellulose, hydroxyethyl cellulose, hydroxypropyl cellulose and carbomethyl cellulose, gum tragacanth used individually or in combination. The method of preparing and making antisettling mixtures of the inventive composition in water is a unique combination of suspending agent and swelled or suspended starch.

If each component of this unique mixture of suspending agent and starch in this composition were used separately, the ability to fight a fire would be drastically reduced. Using just the pseudo-plastic high yield suspending agent would mean the material could be pumped and that it would have cling to hold it to vertical and/or overhead surfaces. Although, the pseudo-plastic high yield-suspending agent is temperature stable, meaning the viscosity does not decrease as the temperature rises, the heated material would have an accelerated evaporation rate. There is no means to slow down the evaporation of the water, such as a crust or char, which forms with starch included in the inventive composition. If, on the other hand, only starch was present, the composition would hard settle in the tanks, pipes and hoses, and if it could be used, the starch composition would not cling to vertical surfaces. If some of the starch is preheated to swell, this increases the clinging ability of the composition, but the viscosity is now so high that it is be impossible for this starch composition to be pumped or sprayed.

The unique mixture in the inventive composition of pseudo-plastic high yield suspending agent and hydrated starch provides a composition in which the starch does not settle, even on aging. The inventive composition has a high yield value with a "shear thinning capacity" which means, the composition becomes thin when pumped and instantly thixotropic or sag resistant, at rest. Thus, after being pumped and sprayed, the composition is capable of clinging to a vertical or overhead surface. In the inventive composition, any starch can be used. Examples of typical starches include corn, wheat, potato, tapioca, barley, arrowroot, rice or any combination of starches. Another example is Fiber-Star P, a preboiled potato starch. This list is not an attempt to limit the number of starches, but to demonstrate that all starches function in this composition to varying degrees. It is contemplated that various starch precursors are also functional in the present inventive composition. The amount of starch used varies, depending on particular characteristics needed for the composition. Formulas can vary in starch content from about 0.01-20.0 wt %. Preferably, a starch content from about 0.05-10 wt % is preferred, and most preferably, the composition has a starch content from about 0.1-2.0 wt %. In a preferred embodiment of the inventive composition, the suspending agent and starch components combined, preferably comprise no more than about 1.00 wt % of the aqueous, thixotropic composition. In a most preferred embodiment of the inventive composition, the suspending agent and starch components combined, preferably comprise no more than about 0.50 wt % of the aqueous, thixotropic composition.

A rheology modifier can also affect starches. The rheology modifier, borate, is used in the composition to add cross linking. Additional value from the borate is that borate is an excellent flame retardant by itself. Commonly, borates are used as modifiers for wetting agents in soaps or washing powders.

Figure 2:
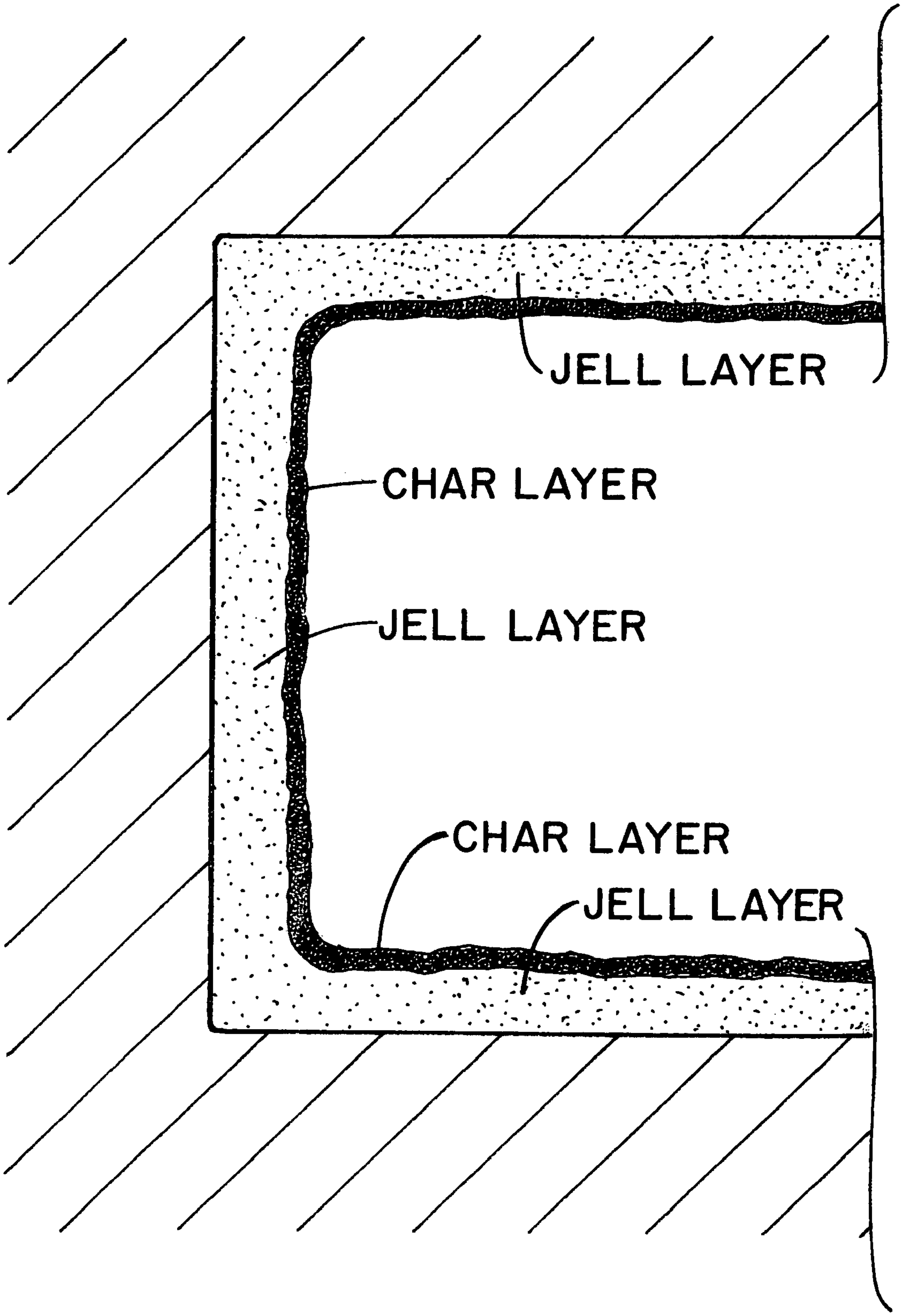
FIG. 2 is a cross sectional view of vertical and horizontal substrates within a fire following application of the inventive composition of the present invention.

Dry starch originally contains about 12% water and has a particle size of 20 microns. When soaked in water, the starch associates and holds up to 18% water and the particle size increases to 40 microns. As the starch/water mixture is heated, in this case by a fire, the starch forms a gel or association with all the surrounding water starting around 160° F. (71° C.). Thus, when the composition is heated, either from the substrate or the air side, the starch absorbs more water at the interface and becomes thicker. On the substrate side, the composition first rides on its own vapor and, as it cools, forms its own film on the substrate surface. On the air side, where evaporation largely occurs, the composition first thickens and then crusts over and eventually is converted to a carbonized char. The char formed is a hard, intumescent coating, which slows the evaporation of water from the composition, as illustrated in FIG. 2. In essence, the composition's own film and char act as a vessel to contain the soft-gelled composition, which now acts as a heat sink to cool the backside of the intumescent char. This synergism between the intumescent hard coating and the composition's aqueous gel helps optimize a very limited amount of water. The char/gel coating further reduces the available combustible material to the fire, and also reduces the smoke emission.

There are no dangerous chemical reactions caused by the application of the inventive composition and its byproducts are neither corrosive nor toxic. Other components can be added to the composition to enhance a desired property, a foaming agent, such as commercially available liquid detergent or liquid soap, being a good example.

Example of Gel Preparation

Four (4) gallons (15,000 grams) of tap water were placed in a 10-gallon container. Seventy-six (76) grams of Carbopol® EZ-3 and seventy-six (76) grams of corn starch were stirred into the water. At this point, the composition had a pH less than 2.5. The pH was adjusted to between 5.5 and 7.0 by adding 10 grams of sodium hydroxide. The composition exhibited shear thinning characteristics but was too thick to be pumped. An additional 2 gallons (7,500 grams) of tap water were added to the container to provide a pumpable composition with suitable thixotropic and shear thinning properties. The components making up the composition on a weight/weight basis are:

Carbopol® EZ-3 -0.335%; corn starch-0.335%; sodium hydroxide-0.044% and water-balance (99.285%).

In the past, when fire fighters were only using water, many times smoldering embers harbored a fire on the inside of a log or limb that later rekindled the fire. With the inventive composition, the combination of an aqueous gel sticking to the charred surface and a wetting agent, which allows it to penetrate into the cracks, gives the fire fighter a much greater chance of extinguishing the fire with no recurrence after the initial contact. The aqueous gel created by the inventive composition contains more than 90% water. This high water yield keeps water where the fire fighter has placed it. The composition reduces the amount of water used and provides increased fire suppression potential per gallon of water. Further, because of the composition's aqueous gel characteristics, the immediate seepage through floors and walls by water is reduced. The water in the composition, now coating and sticking to combustible materials, does not separate in the fire, nor does the water making up the composition drain away. More than 95% of the water used by fire fighters is typically lost immediately from vertical or overhead surfaces due to runoff. The inventive composition both extinguishes existing fires and suppresses rekindling of hot substrate.

Water Yield:

To provide a quantitative measure of the increased ability of the composition of the present invention to hold water to a potentially combustible surface, a water yield test was performed. This test compared composition No. 1, described below, to water. Small wooden strips were vertically dipped to an equal depth in either water or composition No. 1. The wooden strips were weighed before and after dipping to determine the amount of water retained on each strip. One strip dipped into water retained 0.13 grams of water. The strip dipped into composition No. 1 retained 6.93 grams of the aqueous composition. Thus, composition No. 1 retains fifty-three (53) times the water weight on the wooden strip compared to water alone.

In an attempt to maximize the vertical holding capability and minimize the problems that occur in pumping or handling thick materials, a series of decreasing concentrations of suspending agents/starch compositions were evaluated for their ability to hold on a vertical surface. The same compositions were then compared for their ability to resist fire and heat. As an initial point Composition No. 1, with suspending agent and starch at approximately 0.50% each, was used. Five (5) dilutions of Composition No. 1 were then made. Composition No. 14 has about 8.3% less suspending agent and starch. Composition No. 15 has about 16.6% less suspending agent and starch. Composition No. 16 has about 23% less suspending agent and starch. Composition No. 17 has about 28.6% less suspending agent and starch. Composition No. 18 has about 33.3% less suspending agent and starch. The components of each composition are summarized in Table 1 below.

TABLE 1

| PERCENTAGE BY WEIGHT OF COMPONENTS IN THIXOTROPIC COMPOSITION | | | | | | | |
|---|---|---|---|---|---|---|---|
| Ingredient | Component | No. 1 | No. 14 | No. 15 | No. 16 | No. 17 | No. 18 |
| Suspending Agent | Carbopol EZ-3 | 0.5013 | 0.4557 | 0.4177 | 0.3856 | 0.3580 | 0.3342 |
| Starch | corn starch | 0.5013 | 0.4557 | 0.4177 | 0.3856 | 0.3580 | 0.3342 |
| pH Modifier | sodium hydroxide | 0.066 | 0.060 | 0.055 | 0.051 | 0.047 | 0.044 |
| Water | water | 98.9316 | 99.0287 | 99.1096 | 99.1781 | 99.2368 | 99.2877 |

Droop Test:

The above-described compositions were further evaluated for the ability to remain in place when applied to either vertical or overhead surfaces. The clinging ability is measured by the droop test. A cylindrical hole is provided in a ¼ inch thick pine board. The board is placed on a horizontal flat surface and the hole filled with the test composition and leveled with a straight edge. The board is then turned 90 degrees such that the open end of the cylindrical hole is on a vertical surface. The distance that the composition flows downwardly on the vertical surface of the board is determined after a specified time period. The results are tabulated in Table 2.

Char and Burn Through Tests:

These same modified compositions were evaluated by comparing their ability to resist the spread of fire, first on a room temperature (RT) pine wood substrate and second on a preheated, hot pine wood substrate. In this test a 1800° F. propane torch heat source was applied 5 inches from a paddy formed by a stencil ⅛ inch thick and 2 inches in diameter of each composition. When tested, the paddies were held in a vertical position. Before starting the initial test, the heat source was applied to just the pine wood without any protective coating, The combustible pine wood burst into flames in less then 5 seconds. In a comparison of time to first char, all paddies were very similar and the first char occurred around 30 seconds. In a comparison of burn through, another interesting fact appeared. The initial composition, No. 1, and the next two dilutions, No. 14 and No. 15, had approximately the same time to burn through, approximately two (2) minutes. The difference in the next three dilutions appears to be caused by droop. Under flame, the thinness of the paddy allowed the flame to burn through more quickly. If a preheated substrate is used (simulates being on fire) almost all dilutions of the original compositions burned through in the same time if enough preheat had been applied, as seen in Table 2.

TABLE 2

| FIRE, HEAT AND DROOP TESTING OF THIXOTROPIC COMPOSITION | Composition Number | | | | | |
|---|---|---|---|---|---|---|
| | No. 1 | No. 14 | No. 15 | No. 16 | No. 17 | No. 18 |
| Droop Test | | | | | | |
| Initial Weight, lb. | 0.185 | 0.205 | 0.225 | 0.250 | 0.265 | 0.290 |
| Droop Test Dist., inches | 1.75 | 2.42 | 2.70 | 3.10 | 3.85 | 5.30 |
| Burn Test at Room T | | | | | | |
| First Char, minutes | 0:30 | 0:30 | 0:30 | 0:30 | 0:30 | 0:24 |
| Burn Through, minutes | 2:15 | 1:50 | 2:09 | 1:00 | 0:49 | 0:24 |

TABLE 2-continued

| FIRE, HEAT AND DROOP TESTING OF THIXOTROPIC COMPOSITION | Composition Number | | | | | |
|---|---|---|---|---|---|---|
| | No. 1 | No. 14 | No. 15 | No. 16 | No. 17 | No. 18 |
| Burn Test at Elevated T | | | | | | |
| First Char, minutes | | | 0:30 | 0:30 | | 0:30 |
| Burn Through, minutes | | | 2:20 | 2:07 | | 0:30 |

When using the inventive composition to fight a large industrial or commercial fire, water and mold damage after the fire is extinguished is another big issue. The damage to buildings unassociated with the those involved in a fire has become a billion-dollar insurance loss, in addition to a major health problem to future occupancy of these buildings. Reducing the quantity of water needed to fight a fire by increasing the efficiency of the composition to extinguish a fire, as well as the addition of antimicrobials agent to the composition, reduces the impact on all structures.

In comparison to a standard fire fighting foam, the inventive composition has some important differences. The aqueous gel of the composition has the advantage of mass from the high water yield. Fire fighters using a standard foam see the foam quickly evaporating or being broken down, either by radiant heat or direct flame contact. With the high water yield of the inventive composition, greater tolerance to the heat and flames is exhibited, and the composition can be applied in only one step versus the required two steps of most foams.

Optionally, a foaming additive can be added to the inventive composition to fight fires where the inventive composition needs to float. This feature is particularly useful in fighting oil, gasoline or petroleum fires. Without the foaming of the composition, the composition sinks and it is of little value in extinguish the petroleum fire. Another modification includes a simple color-coding to indicate a particular modification of the composition. Addition of a coloring agent to the composition provides facile identification of specific formulations. The color-coding feature minimizes the chance of using the wrong composition for a particular application.

One of the compositions greatest asset is its increased safety feature. The composition's aqueous gel is easily sprayed or pumped like water, but can be projected greater distances than water alone. This allows attack of the fire from an increased distance and reduces the risk to a fire fighter or fire fighting aircraft. The pseudo-plastic, high yield characteristics of the composition cause the material to disperse in small clusters when projected, versus breaking into a mist. This characteristic is advantageous when dropping material from aircraft onto a fire. The composition's aqueous gel also reduces the potential for flashover because of its ability to stay on a surface, maintain a water yield and disrupt the thermal layers on a structure's ceiling and walls during initial attack of a fire. Fires spread very rapidly. It's commonly known that a fire doubles in size every minute during the beginning of a burn, so the more quickly the fire is under control, the less danger there is for the fire fighters.

The inventive composition also finds many other applications. Several of its potential uses include fire breaks sprayed down for forest fires and back fires, application to protect homes, businesses and fuel storage tanks, and less water usage allowing one truck to provide significantly greater fire suppressant capabilities.

In addition, the inventive composition does not make a surface slipperier than water, but a thick coating could give buoyancy. Another potential use includes the coating of fruit trees to protect them from frost. Likewise, the filling of rodent holes with the gel under pressure, thus filling all tunnel voids or cavities, makes the tunnels useless to the rodent. Such uses cause no detrimental effects to the surrounding environment.

It is contemplated that salt water (brine) can be used in place of fresh water when preparing the composition of the present invention. Special pseudo-plastic, high yield suspending agents, which form gels that are nonsensitive to salts, are required when using salt water or brackish water.

While the invention has been particularly shown and described with reference to preferred embodiments thereof, it will be understood by those skilled in the art that various changes in form and details may be made therein without departing from the spirit and scope of the invention.

We claim:

1. A method of extinguishing or suppressing a fire comprising;

providing a thixotropic, fire fighting composition having shear thinning properties comprising at least about 99% water, a pseudo-plastic, high yield, suspending agent, and starch, the composition adjusted to a pH in the range of about 5.0-8.0; and applying the composition comprising at least about 99% water to an area where extinguishment or suppression of the fire is desired, whereby the composition comprising least about 99% water clings to a surface positioned in any orientation, and forms an exterior intuniescent char coating upon fire contact, while retaining an interior aqueous gel composition, thereby extinguishing a fire and preventing rekindling thereof.

2. The method of claim 1, wherein the composition comprising at least about 99% water includes a foaming agent, thereby enabling the composition to float on a hydrocarbon liquid and extinguish a petroleum fire.

3. A method of extinguishing or suppressing a fire comprising;

providing a thixotropic, fire fighting composition having shear thinning properties comprising water, a pseudo-plastic, high yield, suspending agent comprising a mixture of an acrylic acid copolymer cross linked with a polyalkenyl polyether and a synthetic smectite clay, and starch the composition adjusted to a pH in the range of about 5.0-8.0; and applying the composition to an area where extinguishment or suppression of the fire is desired, whereby the composition clings to a surface positioned in any orientation, and forms an exterior inturnescent char coating upon fire contact, while retaining art interior aqueous gel composition, thereby extinguishing a fire and preventing rekindling thereof.

4. The method of claim 3, wherein the composition includes a foaming agent, thereby enabling the composition to float on a hydrocarbon liquid and extinguish a petroleum fire.

* * * * *

UNITED STATES PATENT AND TRADEMARK OFFICE

CERTIFICATE OF CORRECTION

PATENT NO. : 7,476,346 B2
APPLICATION NO. : 11/584706
DATED : January 13, 2009
INVENTOR(S) : Hagquist et al.

It is certified that error appears in the above-identified patent and that said Letters Patent is hereby corrected as shown below:

In claim 1, column 12, line 9; delete "intuniescent" and insert therefore --intumescent--.

In claim 3, column 12, line 29; delete "inturnescent" and insert therefore --intumescent--.

Signed and Sealed this

Seventeenth Day of March, 2009

JOHN DOLL
*Acting Director of the United States Patent and Trademark Office*

US007476346C1

(12) EX PARTE REEXAMINATION CERTIFICATE (9978th)

United States Patent

Hagquist et al.

(10) Number: US 7,476,346 C1

(45) Certificate Issued: Dec. 11, 2013

(54) COMPOSITIONS INHIBITING THE EXPANSION OF FIRE, SUPPRESSING EXISTING FIRE, AND METHODS OF MANUFACTURE AND USE THEREOF

(75) Inventors: James Alroy E. Hagquist, St. Paul, MN (US); Robert M. Hume, III, Woodbury, MN (US); Terrance L. Lund, Woodbury, MN (US); Roderick I. Lund, Woodbury, MN (US)

(73) Assignee: Earthclean Corporation, Minneapolis, MN (US)

Reexamination Request:
No. 90/012,710, Oct. 23, 2012

Reexamination Certificate for:

| | |
|---|---|
| Patent No.: | **7,476,346** |
| Issued: | **Jan. 13, 2009** |
| Appl. No.: | **11/584,706** |
| Filed: | **Oct. 23, 2006** |

Certificate of Correction issued Mar. 17, 2009

Related U.S. Application Data

(62) Division of application No. 11/246,992, filed on Oct. 7, 2005, now Pat. No. 7,163,642.

(60) Provisional application No. 60/617,616, filed on Oct. 11, 2004.

(51) Int. Cl.

| | |
|---|---|
| ***A62D 1/00*** | (2006.01) |
| ***A62C 2/00*** | (2006.01) |
| ***A62C 2/06*** | (2006.01) |
| ***A63C 3/00*** | (2006.01) |
| ***C09K 21/14*** | (2006.01) |
| ***A62C 3/02*** | (2006.01) |
| ***A62C 5/00*** | (2006.01) |

(52) U.S. Cl.
CPC . *A62C 2/065* (2013.01); *A62C 3/02* (2013.01); *A62C 3/0278* (2013.01); *A62C 5/008* (2013.01); *A62D 1/0064* (2013.01)
USPC ................. 252/606; 169/44; 169/45; 169/46; 252/2; 252/3; 252/602; 252/603; 252/607; 252/610; 252/8.05

(58) Field of Classification Search
None
See application file for complete search history.

(56) References Cited

To view the complete listing of prior art documents cited during the proceeding for Reexamination Control Number 90/012,710, please refer to the USPTO's public Patent Application Information Retrieval (PAIR) system under the Display References tab.

*Primary Examiner* — Timothy J Kugel

(57) ABSTRACT

The invention relates to compositions that prevent expansion of a fire, suppress existing fire, as well as methods of preparing and using such compositions. The composition is comprised of water, pseudo-plastic high yield suspending agent and starch. Compositions may contain additional functional agents, such as rheological, wetting, foaming, coloring, chelating, antimicrobial and stabilizing agents. In the description of the present invention, all composition modifications are referred to as compositions. The composition, an augmentation of water, exhibits the characteristics of a sag resistant aqueous gel in the tank, but has shear thinning capacity, allowing the composition to be pumped or sprayed as easily as water. At the point of impact, when the sprayed composition is again at rest, it instantly reverts to a sag resistant aqueous gel. The composition also forms an intumescent, surface char layer upon contacting a fire. Foaming of the augmented composition on impact can be incorporated, which is advantageous for fighting petroleum fires.

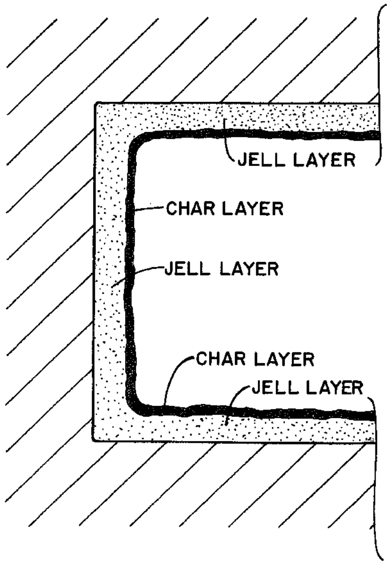

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 3 and 4 is confirmed.

Claim 1 is determined to be patentable as amended.

Claim 2, dependent on an amended claim, is determined to be patentable.

New claims 5-31 are added and determined to be patentable.

1. A method of extinguishing or suppressing a fire comprising;

providing a thixotropic, fire fighting composition having shear thinning properties comprising at least about 99% water, a pseudo-plastic, high yield, suspending agent *comprising a polyacrylate and clay* and starch, the composition adjusted to a pH in the range of about 5.0-8.0; and applying the composition comprising at least about 99% water to an area where extinguishment or suppression of the fire is desired, whereby the composition comprising least about 99% water clings to a surface positioned in any orientation, and forms an exterior intumescent char coating upon fire contact, while retaining an interior aqueous gel composition, thereby extinguishing a fire and preventing rekindling thereof.

*5. A method of extinguishing or suppressing a fire comprising; providing a thixotropic, fire fighting composition having shear thinning properties comprising at least about 99% water, a pseudo-plastic, high yield, suspending agent, and starch, the composition adjusted to a pH in the range of about 5.0 to 8.0; and applying the composition comprising at least about 99% water to an area where extinguishment or suppression of the fire is desired, whereby the composition comprising least about 99% water clings to a surface positioned in any orientation, and forms an exterior intumescent char coating upon fire contact, while retaining an interior aqueous gel composition, thereby extinguishing a fire and preventing rekindling thereof, wherein the composition comprises 0.5 wt % or less of a pseudo-plastic, high yield, suspending agent comprising an acrylic acid copolymer cross linked with a polyalkenyl polyether; and 0.5 wt % or less of starch.*

*6. The method of claim 5, wherein the starch is selected from the group consisting of corn starch, wheat starch, potato starch, tapioca starch, barley starch, arrowroot starch, rice starch and combinations thereof.*

*7. The method of claim 5, wherein the composition further includes at least one component selected from the group consisting of a surfactant or wetting agent, a chelating agent, a conventional fire retardant, a pH buffering agent, a coloring agent, an antimicrobial agent, a foaming agent, a defoaming agent, and a film forming agent.*

*8. The method of claim 5, wherein the suspending agent and starch components combined comprise no more than about 0.50 wt % of the aqueous, thixotropic composition.*

*9. The method of claim 5, wherein the suspending agent and starch components are present in approximately equal amounts, by weight, in the aqueous, thixotropic composition.*

*10. The method of claim 5, wherein the acrylic acid copolymer cross linked with a polyalkenyl polyether and a synthetic smectite clay are present in approximately equal amounts, by weight, in the aqueous, thixotropic composition.*

*11. A method of extinguishing or suppressing a fire comprising; providing a thixotropic, fire fighting composition having shear thinning properties comprising at least about 99% water, a pseudo-plastic, high yield, suspending agent, and starch, the composition adjusted to a pH in the range of about 5.0 to 8.0; and applying the composition comprising at least about 99% water to an area where extinguishment or suppression of the fire is desired, whereby the composition comprising least about 99% water clings to a surface positioned in any orientation, and forms an exterior intumescent char coating upon fire contact, while retaining an interior aqueous gel composition, thereby extinguishing a fire and preventing rekindling thereof,*

*wherein the composition comprises equal amounts of a pseudo-plastic, high yield, suspending agent comprising a mixture of an acrylic acid copolymer cross linked with a polyalkenyl polyether and starch.*

*12. The method of claim 11, wherein the composition further includes at least one component selected from the group consisting of a surfactant or wetting agent a chelating agent a conventional fire retardant, a pH buffering agent, a coloring agent, an antimicrobial agent, a foaming agent, a defoaming agent, and a film forming agent.*

*13. The method of claim 11, wherein the suspending agent end starch components combined comprise no more than about 0.50 wt % of the aqueous, thixotropic composition.*

*14. The method of claim 11, wherein the acrylic acid copolymer cross linked with a polyalkenyl polyether and a synthetic smectite clay are present in approximately equal amounts, by weight, in the aqueous, thixotropic composition.*

*15. A method of extinguishing or suppressing a fire comprising; providing a thixotropic, fire fighting composition having shear thinning properties comprising at least about 99% water, a pseudo-plastic, high yield, suspending agent, and starch, the composition adjusted to a pH in the range of about 5.0 to 8.0; and applying the composition comprising at least about 99% water to an area where extinguishment or suppression of the fire is desired, whereby the composition comprising least about 99% water clings to a surface positioned in any orientation, and forms an exterior intumescent char coating upon fire contact, while retaining an interior aqueous gel composition, thereby extinguishing a fire and preventing rekindling thereof,*

*wherein the pseudo-plastic, high yield, suspending agent comprises an equal weight mixture of an acrylic acid copolymer cross linked with a polyalkenyl polyether and a synthetic smectite day and starch.*

*16. The method of claim 15, wherein the suspending agent and starch components are present in approximately equal amounts, by weight, and combined comprise no more than about 0.50 wt % of the aqueous, thixotropic composition.*

*17. The method of claim 15, the composition further includes at least one component selected from the group consisting of a surfactant or wetting agent, a chelating agent, a conventional fire retardant, a pH buffering agent, a coloring agent, an antimicrobial agent, a foaming agent, a defoaming agent, and a film forming agent.*

*18. A method of extinguishing or suppressing a fire comprising; providing a thixotropic, fire fighting composition having shear thinning properties comprising at least about 99% water, a pseudo-plastic, high yield, suspending agent comprising polyacrylate and clay, and starch, the composition adjusted to a pH in the range of about 5.0 to 8.0; and applying the composition comprising at least about 99% water to an area where extinguishment or suppression of the fire is desired, whereby the composition comprising least about 99% water clings to a surface positioned in any orientation, and forms an exterior intumescent char coating upon fire contact, while retaining an interior aqueous gel composition, thereby extinguishing a fire and preventing rekindling thereof,*

*wherein the composition comprises NaOH for pH adjustment.*

*19. The method of claim 3, wherein the composition comprises NaOH for pH adjustment.*

*20. The method of claim 5, wherein the composition comprises NaOH for pH adjustment.*

*21. The method of claim 11, wherein the composition comprises NaOH for pH adjustment.*

*22. The method of claim 15, wherein the composition comprises NaOH for pH adjustment.*

*23. A method of extinguishing or suppressing a fire comprising; providing a thixotropic, fire fighting composition having shear thinning properties comprising at least about 99% water, a pseudo-plastic, high yield, suspending agent comprising casein, alginates or modified cellulose, and starch, the composition adjusted to a pH in the range of about 5.0 to 8.0; and applying the composition comprising at least about 99% water to an area where extinguishment or suppression of the fire is desired, whereby the composition comprising least about 99% water clings to a surface positioned in any orientation, and forms an exterior intumescent char coating upon fire contact, while retaining an interior aqueous gel composition, thereby extinguishing a fire and preventing rekindling thereof,*

*wherein the composition comprises a borate.*

*24. The method of claim 3, wherein the composition comprises a borate.*

*25. The method of claim 5, wherein the composition comprises a borate.*

*26. The method of claim 11, wherein the composition comprises a borate.*

*27. The method of claim 15, wherein the composition comprises a borate.*

*28. The method of claim 3, wherein the composition comprises a wetting agent.*

*29. The method of claim 5, wherein the composition comprises a wetting agent.*

*30. The method of claim 11, wherein the composition comprises a wetting agent.*

*31. The method of claim 15, wherein the composition comprises a wetting agent.*

* * * * *